(12) United States Patent
Lee

(10) Patent No.: US 7,703,345 B2
(45) Date of Patent: Apr. 27, 2010

(54) SYSTEM FOR MONITORING DISMANTLING PROCESS OF SCRAPPED VEHICLE

(75) Inventor: Won Bae Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 426 days.

(21) Appl. No.: 11/648,865

(22) Filed: Dec. 29, 2006

(65) Prior Publication Data

US 2008/0051928 A1    Feb. 28, 2008

(30) Foreign Application Priority Data

Aug. 9, 2006  (KR) .................... 10-2006-0075019

(51) Int. Cl.
*G01N 19/00*    (2006.01)
(52) U.S. Cl. ..................... 73/865.9; 700/213
(58) Field of Classification Search ............... 73/865.9; 700/213
See application file for complete search history.

(56) References Cited

U.S. PATENT DOCUMENTS

| 4,905,363 A | 3/1990 | Boyenval |
| 5,176,187 A * | 1/1993 | Grant .......................... 141/10 |
| 5,521,815 A * | 5/1996 | Rose, Jr. ....................... 705/28 |
| 6,076,064 A * | 6/2000 | Rose, Jr. ........................ 705/1 |
| 2005/0193541 A1* | 9/2005 | Davidyan .................. 29/426.1 |

FOREIGN PATENT DOCUMENTS

| JP | 06-064502 | 3/1994 |
| JP | 2005-280682 | 10/2005 |
| KR | 2004-0000246 | 1/2004 |
| KR | 2005-0083490 | 8/2005 |
| KR | 2006-0054834 | 5/2006 |

* cited by examiner

*Primary Examiner*—Hezron Williams
*Assistant Examiner*—Rodney T Frank
(74) *Attorney, Agent, or Firm*—Morgan, Lewis & Bockius LLP

(57) ABSTRACT

A system for monitoring a dismantling process of scrapped vehicle includes an input means for inputting vehicle information, a weighing means for measuring a weight of dismantled parts collected in each process and a weight of collected liquid materials, and a detecting means for detecting a work start point and end point. The information measured by the means are input to a central computer so that the central computer collects vehicle information, time information for each process, weight information of collected parts and liquid materials, and thereby monitors the entire dismantling processes in real-time and the information, such as, a kind of vehicle, a working time for each process, a weight of collected part and liquid material, a reusing rate and so on, can be stored in a database.

14 Claims, 10 Drawing Sheets

Direction of bogie truck

SYSTEM FOR MONITORING DISMANTLING PROCESS OF SCRAPPED VEHICLE

CROSS-REFERENCE TO RELATED APPLICATIONS

This application claims priority from Korean Patent Application No. 2006-0075019 filed on Aug. 9, 2006 with the Korean Intellectual Property Office, the disclosure of which is incorporated herein by reference.

TECHNICAL FIELD OF INVENTION

The present invention relates to a system for monitoring a dismantling process of scrapped vehicles. More particularly, the system for monitoring a dismantling process of scrapped vehicles includes monitoring a work situation for each process of the entire dismantling processes of scrapped vehicle.

BACKGROUND OF INVENTION

Nowadays, motorcars have become a necessity of everyday human life and industrial activity. Likewise, the number of registered vehicles has increased rapidly in recent years and the number of scrapped vehicles has increased gradually accordingly. Scrapped vehicles, however, have low economic value-added due to completion of their life span and since scrapped vehicles are complicated products made of many parts, a pretreatment is essential for reuse. However, since the current pretreatment is carried out mostly by hand, the treatment cost is high. Furthermore, the used parts have a short product life cycle, therefore a problem exists that the used parts can be reused only within a restricted extent. On the average, about 75% of an entire weight of a scrapped vehicle is reused. Seeing that the motorcars are large-sized durable consumer goods made of various materials, the reuse ratio is good in comparison with other consumer goods. However, most of the reused materials are irons and nonferrous metals, and the rest 25% is buried as ASR.

Generally, the dismantling process of scrapped vehicle can be divided into a process of reclaiming and selling the used parts and a process of shredding the remaining scrapped vehicle. Infrastructure for dismantling the scrapped vehicle is constructed comparatively well in Japan and European countries having small territories. In the case of Germany, about 3,000~4,000 relevant enterprises perform the dismantling process of scrapped vehicle. However, in Korea, since it is not yet arrived at the number of scrapped vehicles (more than one million) which has a sufficient economic value, the infrastructure for dismantling scrapped vehicle is inadequate. Further, since the reuse of used parts are restricted by automobile management law, the relevant enterprises can not be a main supplying sources of the used parts and simply function to dismantle the scrapped vehicles. Therefore, almost all the relevant enterprises are small and thus can not expect scale merit.

Recently, in order to increase the reuse of used parts produced from the dismantling process of scrapped vehicles, the automobile management law has been amended to greatly expand the kind of used parts allowable for reuse. According to environmental laws relative to the recycle of scrapped vehicles in Europe, all car-makers should collect scrapped vehicles generated from all vehicles including nine-seater or below cars/vans and 3.5 tons or below trucks, which are sold after Jul. 1, 2002, at their own expense, and the vehicles sold before Jul. 1, 2002 should be collected from Jan. 1, 2007.

Under the above-mentioned laws, since all of the car-makers should collect their vehicles at their own expense and also construct separately a dismantling system in their companies to process the collected vehicles in an environment-friendly manner, enormous additional expenses are expected. By the influence of the above laws in Europe, there is a high possibility that the laws relative to scrapped vehicles in Korea will be amended so that the car-makers should collect the scrapped vehicles, which are generated from their sold vehicles, at their own expense. Therefore, in order to rapidly deal with such a change, the car-makers in Korea need to prepare a dismantling plant for processing scrapped vehicles, in which a dismantling system thereof is simplified and automated so as to process a large quantity of scrapped vehicles by stages.

However, in order to collect and dismantle all of the scrapped vehicles generated from their sold vehicles at their expenses, the car-makers should be able to process the same number of scrapped vehicles as the number of sold vehicles. If the car-makers employ a conventional method and system for dismantling the scrapped vehicles, it will cause various troubles.

In other words, the conventional system for dismantling scrapped vehicles performs the dismantling process using various equipments which are two-dimensionally developed on the ground having a desired area. However, since the conventional system has complicated and extensive construction and processes, there are some problems that it takes so much time and cost to dismantle each of the scrapped vehicles and there are many risk factors for accidents during the dismantling process and it is difficult to secure a space for storing the used parts generated in the dismantling process.

To solve the above problems, there has been proposed a method of dismantling scrapped vehicles disclosed in Korean Patent Laid-Open Publication No. 2004-246 on Jan. 13, 2004, in which dismantling processes are divided into several stages and then assigned in each story of a multi-story structure or building and the dismantling processes are performed in turn from the uppermost story toward the lowermost story.

In the above-mentioned dismantling method, if the dismantling processes in one story are completed, the scrapped vehicle is transported to the next lower story by an elevator provided at both sides of the building. A process of collecting liquid materials is performed at the uppermost story, and a process of removing explosive parts and collecting parts to be reused, a process of collecting interior/exterior parts and a process of collecting parts of engine, exhausting system and chassis are respectively performed in turn at each of the next lower stories, and finally, a process of collecting remaining parts is performed at the lowermost story.

According to Japanese Patent Laid-Open Publication No. 2005-280682 published on Oct. 13, 2005, there is disclosed another method and system for dismantling scrapped vehicles, in which equipments for performing each dismantling process from a process of stocking the scrapped vehicles to a final process of compressing a body of the scrapped vehicle are arranged in series on one line, and a transporting rail which a bogie truck for transporting the scrapped vehicle can be moved along is provided on the ground, and a bogie truck returning system is provided to return the bogie truck to an initial position through a pit constructed under the ground and another transporting rail provided in the pit.

In the above mentioned system, the dismantling processes are performed in the order as follows: checking of objective parts to be dismantled; preparation; processing of explosive parts; collecting of liquid materials; dismantling of exterior parts; dismantling of interior parts; dismantling of parts of engine/transmission/exhausting system/chassis; compressing of a body of the scrapped vehicle. After the final compressing process is finished, the empty bogie truck is lifted down in the pit and returned to the initial position through the transporting rail by using the bogie truck returning system. Then, while the bogie truck is lifted up on the ground and moved along the transporting rail on the ground, the dismantling processes are performed repeatedly.

Meanwhile, in the dismantling processes of scrapped vehicles, as described above, there has been proposed a method in which various information for each scrapped vehicle, such as a process starting and ending situation of a main process, a current position, a time required for each process, a completion status of the entire processes, an operator and the like, are collected, and a record of working performance for each operator is also collected, and a working situation can be monitored in real-time, and the collected database is optimized and then provided as useful dismantling data at each car-maker.

A system of dismantling the scrapped vehicle, in which various information is collected by using RFID (Radio Frequency Identification), and a body transporting unit is used instead of the bogie truck, and RFID readers are disposed at main processes such as a preprocess, a process of collecting nonferrous metals, a process of compressing a body of the scrapped vehicle and so on. Each of the RFID readers is connected to a data server through LAN (Local Area Network) so that the information collected by the RFID readers is transmitted through the LAN to the data server.

Herein, each of the RFID readers receives identification information from two cards (tags) in which specific IDs for the operator and the vehicle are input, and the identification information read from the cards by the RFID readers is transmitted to the data server. At this time, each of the RFID readers recognizes work start and end points of corresponding process and transmits them to the data server. The work start point is a point of time when the operator installs the cards at the RFID reader of each process, and the work end point is a point of time when the operator removes the cards from the RFID reader. As the result, the information of vehicle to be dismantled, work start and end time, working time and operation is input and collected at the data server. By this information, the working situation can be monitored in real-time, and a record of working performance for each operator can be also collected.

However, in the system of dismantling scrapped vehicles, as described above, there is a disadvantage that the operator has to directly input a processing situation of the scrapped vehicle to the reader by using the card. Further, only the information such as the work start and end time, the working time and the like can be collected, and it is not possible to monitor whether each process is performed properly or whether a reusing rate arrives at a desired value and to collect useful dismantling information such a weight of part, a collecting rate of the liquid materials and the like.

SUMMARY OF THE INVENTION

Accordingly, it is an aspect of the present invention to provide a system for monitoring a dismantling process of scrapped vehicles in which various information for each process such as, a working time, weights of collected parts and liquid materials, and the like are collected together with information of a vehicle kind to be dismantled. It is another aspect of the present invention to provide a system for monitoring a dismantling process of scrapped vehicle in which the entire processes can be monitored in real-time by using the collected information and the information such as vehicle kind, a working time for each process, a weight of collected part and material, a reusing rate and so on can be collected and stored in a database.

It is yet another aspect of the present invention to provide a system for monitoring a dismantling process of scrapped vehicles that can monitor whether each process is performed properly or whether a reusing rate arrives at a desired value and collect a record of working performance for each operator and evaluate facility of the dismantling processes and computerize the dismantling processes.

The foregoing and/or other aspects of the present invention can be achieved by providing a system for monitoring a dismantling process of scrapped vehicle. The system includes scrapping the vehicle by a process of registering the scrapped vehicle and checking objective parts to be dismantled after entering the scrapped vehicle. Next, the system includes a process of processing explosive parts, a preparation process, a process of collecting liquid materials, a process of dismantling exterior parts, a process of dismantling interior parts, a process of dismantling parts of engine/transmission, and a process of compressing a body of the scrapped vehicle. The system also includes an input means for inputting vehicle information like a kind and history of vehicle and work instruction information like a checked list of parts to be dismantled in the process of registering the scrapped vehicle and checking objective parts to be dismantled. The system also includes a weight measuring means for measuring a weight of the entered scrapped vehicle in the process of registering the scrapped vehicle and checking objective parts to be dismantled; a weighing means for measuring a weight of dismantled parts collected in each process and a weight of each of collected liquid materials. The system also includes a detecting means for detecting a work starting and ending point of each process and another weighing means for measuring a weight of compressed body in the compressing process. Finally, the system also includes a central computer connected to the above means to be communicated, for collecting, processing, storing, outputting and displaying data transmitted from the means.

Preferably, the input means includes a bar code system which inputs the vehicle information and the work instruction information and generates a bar code including the information, and a scanner which reads the input information from the bar code generated by the bar code system and then transmits the information. Preferably, the weight measuring means for measuring the weight of the scrapped vehicle is a load cell disposed with lifting device for transporting a bogie truck between transporting rails on a ground and in a pit at the process of registering the scrapped vehicle and checking objective parts to be dismantled.

Preferably, the weighing means for measuring a weight of each of liquid materials collected in the process of collecting liquid materials is a load cell disposed at each container in which the liquid materials are separately collected by their assortments, so that the weight of each of the liquid materials is separately measured by their assortments. Preferably, in the process of registering the scrapped vehicle and checking objective parts to be dismantled, the process of processing explosive parts, the preparation process, the process of collecting liquid materials, the process of dismantling exterior parts, the process of dismantling interior parts, and the process of dismantling parts of engine/transmission, the detecting means for detecting the work starting and ending point of each process is a proximity sensor disposed at a clamp of a clamping device for fastening/releasing a bogie truck at a work position, and the central computer recognizes a point of time when the clamp is coupled to the bogie truck, which is detected by the proximity sensor, as the work starting point, and also recognizes a point of time when the clamp is separated from the bogie truck as the work ending point.

Further preferably, in the process of compressing the body of scrapped vehicle, the detecting means for detecting the work starting and ending point is a proximity sensor disposed at a body compressing device. The central computer recognizes a point of time when the body to be compressed is detected for the first time by the electric signal of the proximity sensor as the work starting point. The process also recognizes a point of time when the compressed body is moved and separated as the work ending point.

BRIEF DESCRIPTION OF THE DRAWINGS

The above and/or other aspects and advantages of the prevent invention will become apparent and more readily appreciated from the following description of the exemplary embodiments, taken in conjunction with the accompany drawings, in which.

DETAILED DESCRIPTION OF THE EMBODIMENTS OF THE INVENTION

Figure 1:
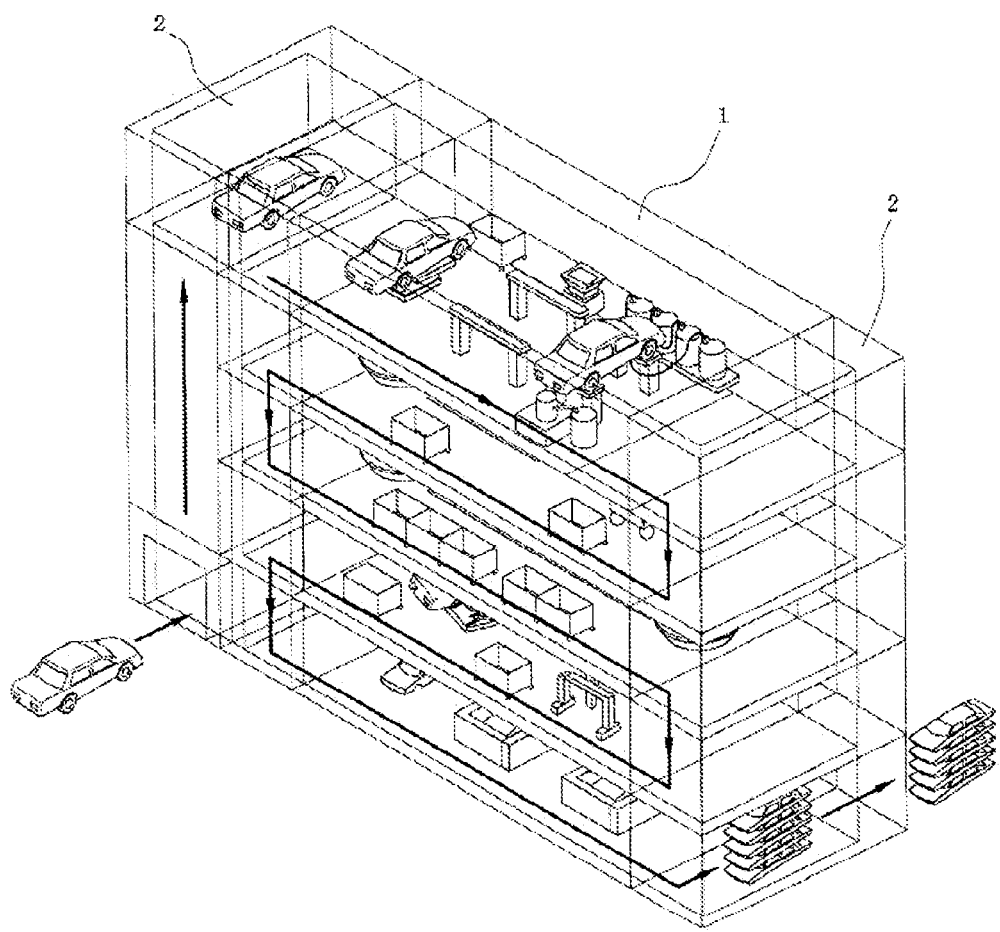
FIG. 1 is a view showing a system for monitoring a dismantling process of scrapped vehicle according to an embodiment of the present invention.
Figure 2:
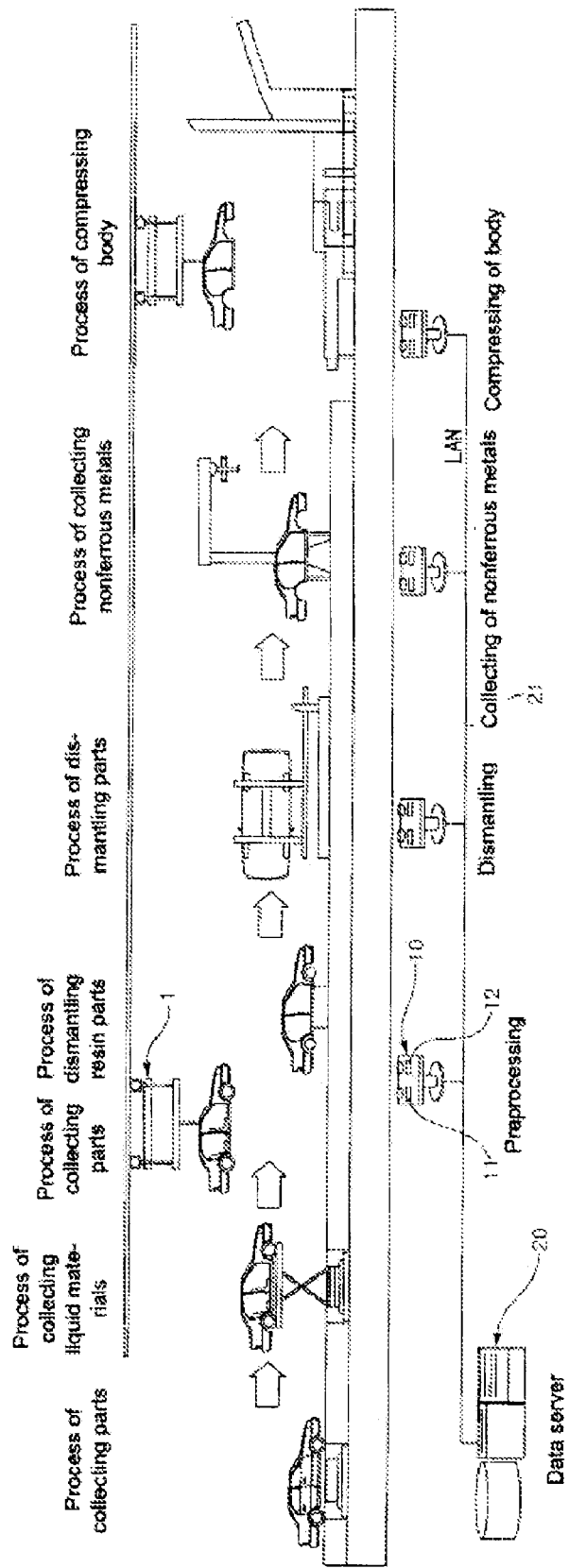
FIG. 2 is a view showing a construction and a working flow of a monitoring hardware in the system according to an embodiment of the present invention.

Reference will now be made in detail to a preferred embodiment of the present invention, examples of which are illustrated in the accompanying drawings, wherein like reference numerals refer to like elements throughout. The embodiments are described below so as to explain the present invention by referring to the figures.

Referring to FIGS. 1-4, a system for monitoring a dismantling process of scrapped vehicle includes monitoring hardware for monitoring the dismantling process of each scrapped vehicle and a program for data collected and monitored by a central computer. In the system as shown in the Figures, if a scrapped vehicle is entered, the dismantling processes are performed in the order as follows: first the system registers the scrapped vehicle and check objective parts to be dismantled (S1); processing explosive parts (S2); preparation (S3); collecting liquid materials (S4); dismantling exterior parts (S5); dismantling interior parts (S6); dismantling parts of engine/transmission (S7); compressing a body of the scrapped vehicle (S8).

In FIG. 1, transporting rail 31 is disposed on the ground and a bogie truck 36 is moved along in the order of dismantling processes. A pit 32 for returning the bogie truck 36 to an initial position and another transporting rail 33 is disposed in the pit 32. Lifting devices 34 and 35 are disposed for lifting the bogie truck 36 up and down between the transporting rail 31 on the ground and the transporting rail 33 in the pit 32.

In use, the entered scrapped vehicle 100 is put on the bogie truck 36 and then moved along with the bogie truck 36 according to the order of each process. Each of the dismantling processes is performed while the scrapped vehicle 100 is moved. A body of the scrapped vehicle is compressed after the process of dismantling of parts of engine/transmission (S7). The bogie truck 36 is lifted down into the pit 32 by the lifting device 35 in the process of dismantling of parts of engine/transmission (S7) and then lifted up on the ground by the lifting device 34 in the process of registering the scrapped vehicle and checking of objective parts to be dismantled (S1). Then, if a newly entered vehicle to be scrapped is put on the bogie truck 36, the above mentioned dismantling processes are performed repeatedly in the same manner while the scrapped vehicle is moved along with the bogie truck 36.

According to the present invention, in order to measure a weight of the entered scrapped vehicle 100, a weight of the compressed body, a weight of the collected liquid materials, a weight of the collected parts and a work starting and ending time of an operator, various detecting means are used. The information measured by the detecting means is collected in a central computer through a wire communication network.

Hereinafter, the dismantling processes of scrapped vehicle according to the present invention are described fully by processes.

First, if the scrapped vehicle 100 is entered at the process of registering the scrapped vehicle and checking of objective parts to be dismantled (S1), the operator checks various information such as the kind of vehicle, vintage, mileage and the like together with the parts to be dismantled and then inputs the various vehicle information and work instructions by using a desired input means. The input information is transmitted to the central computer 70 connected with a wire communication network 71 and stored thereon. For example, a bar code generated by a bar code system 41 may be used to input various vehicle information and checked information.

Figure 3:
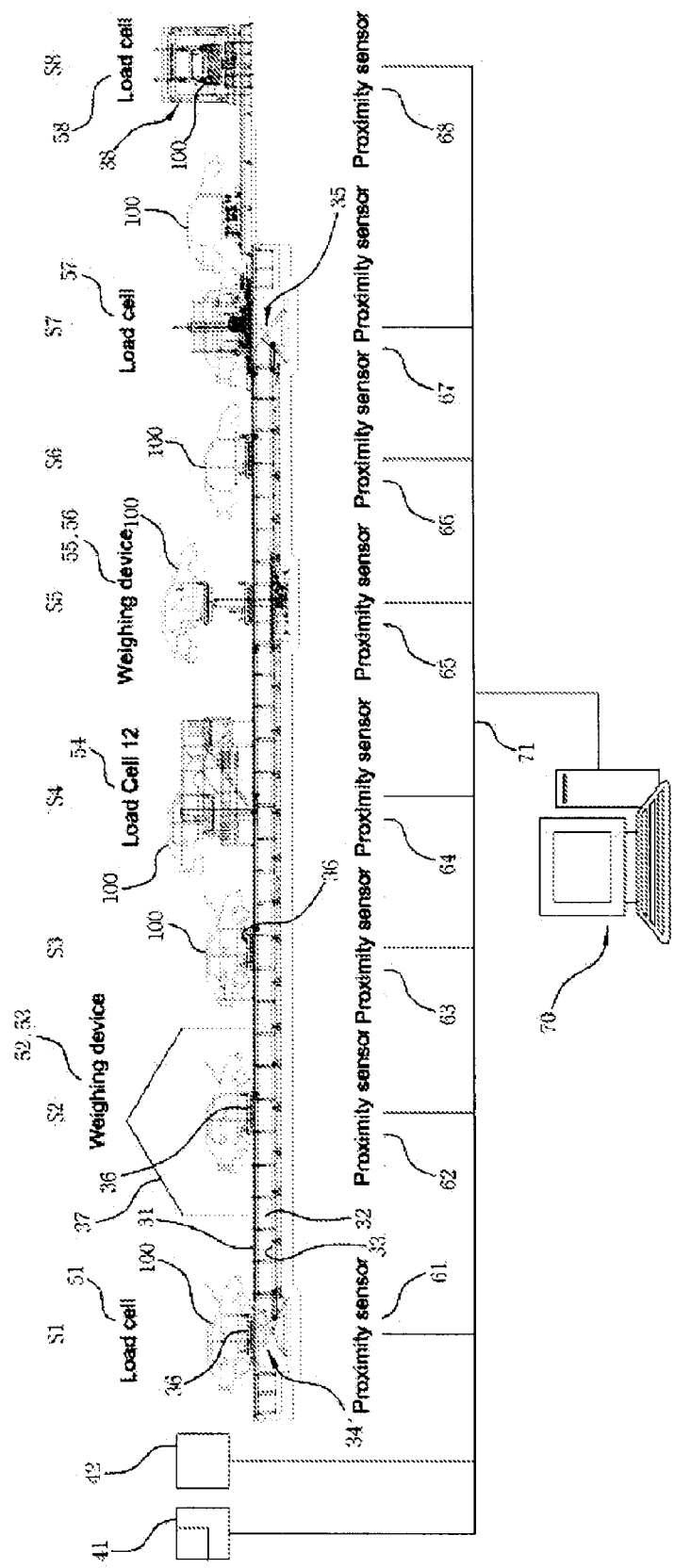
FIG. 3 is a flow chart of monitoring the dismantling process of each scrapped vehicle according to an embodiment of the present invention.

As shown in FIG. 3, vehicle information, like the kind and history (vintage, mileage, etc.), of vehicle and the work instructions including a list of parts to be dismantled are input to the bar code. The bar code is read by a scanner 42 and then attached to the scrapped vehicle 100. The scanner 42 is connected through the wire communication network 71 to the central computer 70. Therefore, the information read from the bar code by the scanner 42, i.e., information input to the bar code are transmitted to and stored on the central computer 70. Of course, other basic information of the vehicle and checking items may be directly input by the operator through a separate terminal, not through the bar code type. At this time, the information input through the terminal are transmitted to and stored on the central computer 70.

In the process of registering the scrapped vehicle and checking objective parts to be dismantled (S1), if the scrapped vehicle 100 is put on the bogie truck 36 positioned at the lifting device 34, a weight of the scrapped vehicle 100 and the bogie truck 36 is detected by a load cell 54 integrally disposed at the lifting device 34. The value measured by the load cell 54 is transmitted to and stored on the central computer 70.

The load cell 54 is connected to the central computer 70 through the wire communication network 71, e.g., RS-422 communication. If the weight value of the scrapped vehicle including the bogie truck 36 is transmitted, the central computer 70 calculates and stores the net weight of the scrapped vehicle excluding the bogie truck 36. Meanwhile, there is provided a means for detecting work starting and ending points of the process of registering the scrapped vehicle and checking of objective parts to be dismantled (S1). A proximity sensor 61 disposed at the clamping device for fixing the bogie truck 36 at a working position is used as the detecting means.

As shown in FIG. 1, the proximity sensors 61~67 are respectively disposed in each process S1~S7, particularly, at the clamping device for the bogie truck 36 at the working position (however, in the processing of compressing the body of scrapped vehicle (S8), the proximity sensor is disposed at a body compressing device 38).

Figure 5:
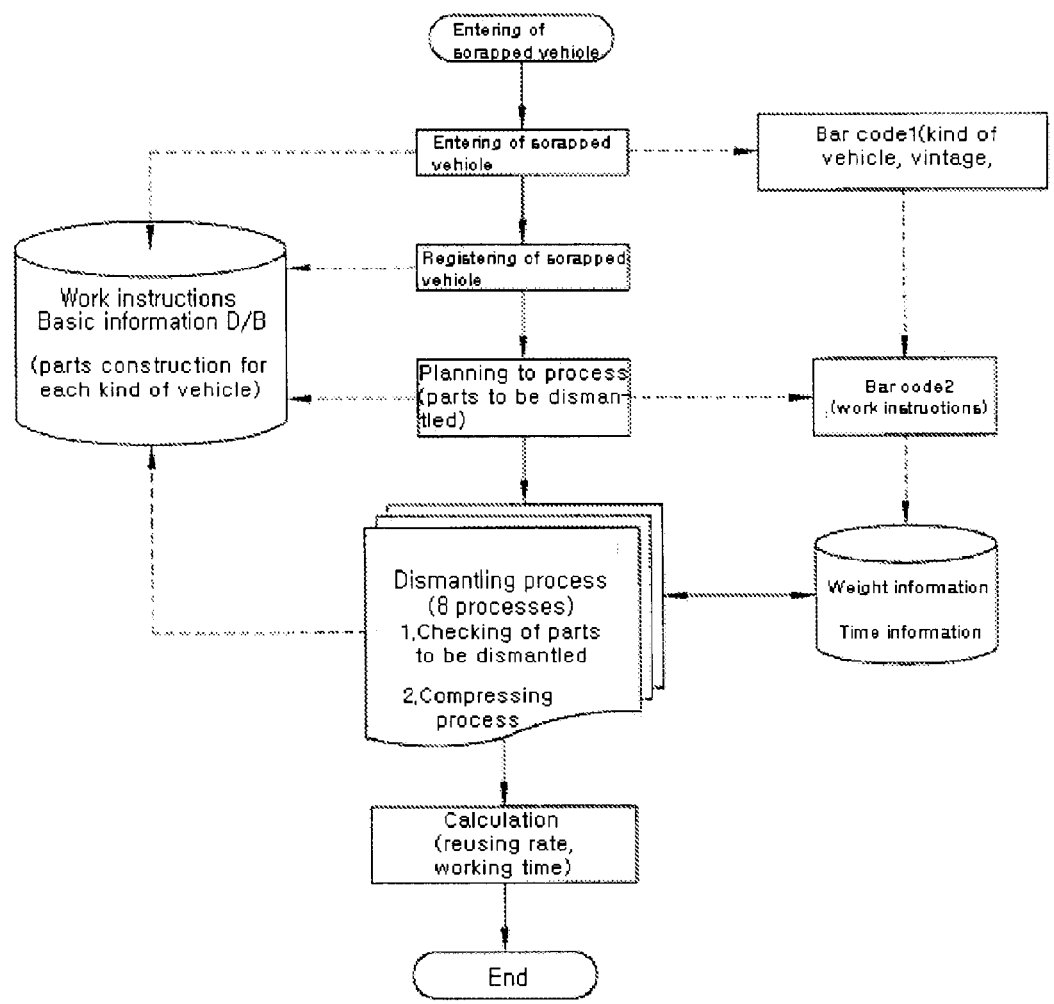
FIGS. 5 and 6 are views showing an example of a clamping device used for each process in the system according to an embodiment of the present invention.
Figure 6:
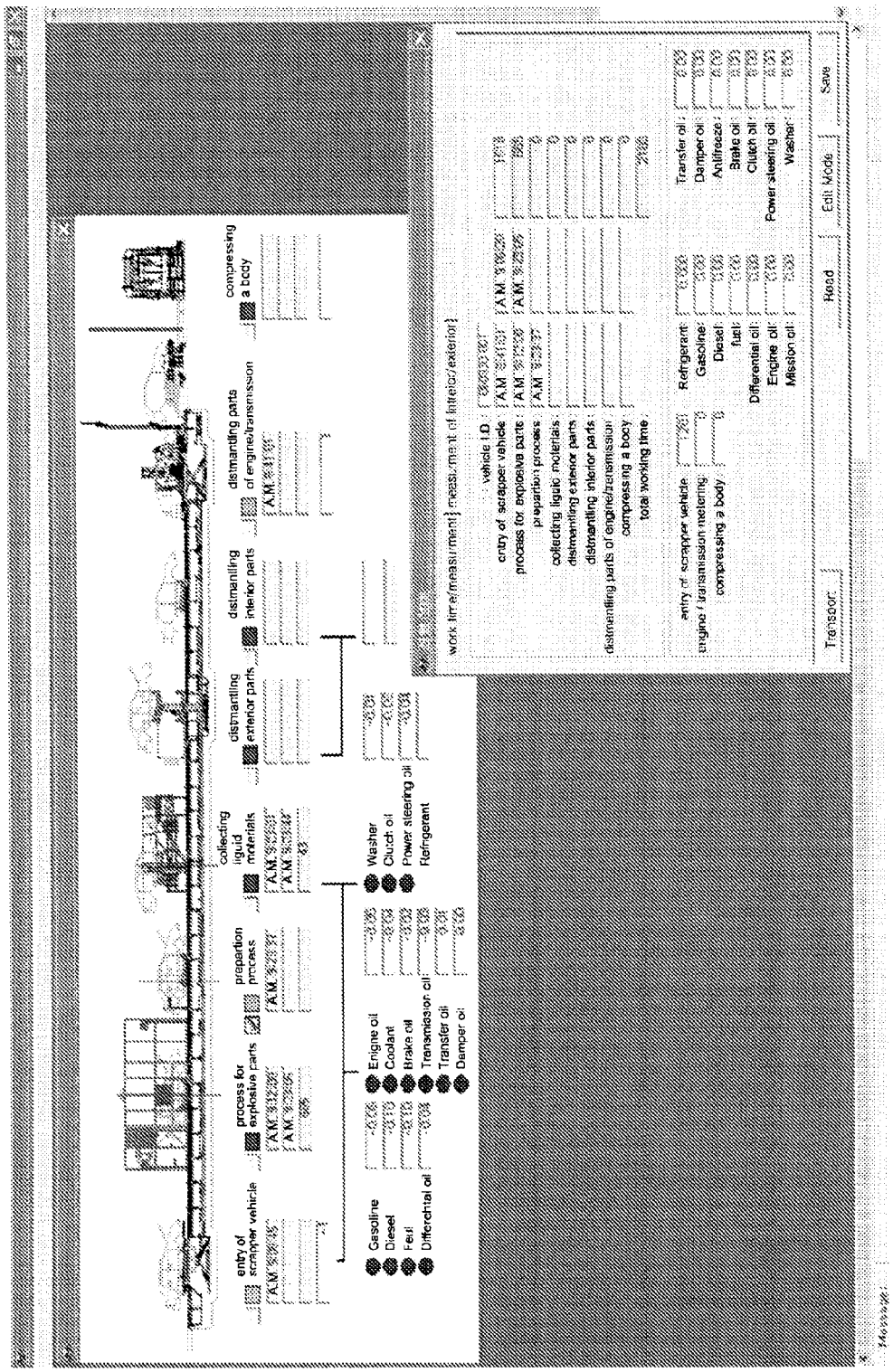

FIGS. 5 and 6 are views showing an example of a clamping device 80 used for each process in the system according to the present invention, wherein a clamp 87 fixes the bogie truck at the working position when an air cylinder 82 is operated. The clamping device 80 is disposed at a middle position of the transporting rail 31, particularly, at a lower side of the bogie truck 36 which moves the transporting rail 31, so that the clamp 87 clamps on/off the bogie truck located at an upper side of the clamping device 80.

As shown in FIGS. 5 and 6, the clamp 87 of the clamping device 80, which substantially clamps on/off the bogie truck, is lifted up and down by the air cylinder 82 so as to clamp on the bogie truck at a status that the bogie truck is lifted up and clamp off the bogie truck at a status that the bogie truck is lifted down. In the clamping device 80, the air cylinder 82 is fixedly disposed on a supporting plate 81, and a distal end of a piston of the air cylinder 82 is connected to a lower end of a rotational member 84, and the rotational member 84 is integrally formed with a rotational shaft 85 in which a bearing 86 is provided at both ends thereof so that an end of the rotational member 84 is rotatably supported. Further, the clamp 87 is integrally provided at an upper side of the rotational member 84.

Now, an operational status of the clamping device will be described. If the piston 83 is moved forward by the air cylinder 82 disposed on the supporting plate 81, while the rotational member 84 rotates around the bearing 86, the clamp 87 located at an upper side of the rotational member 84 is ascended (see FIG. 5). If the piston 83 is moved backward by the air cylinder 82, the rotational member 84 reversely rotates, and the clamp 87 is descended (see FIG. 5).

Figure 7:
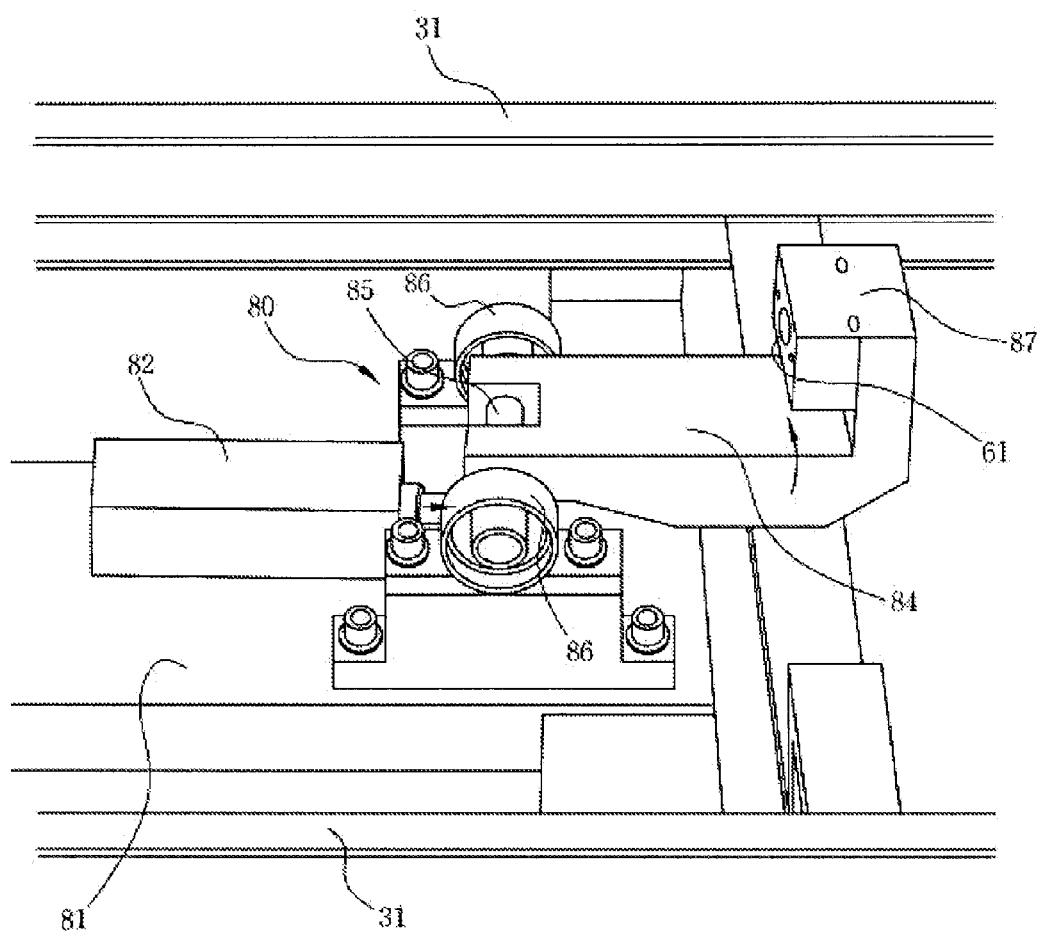
FIG. 7 is a view showing a status that a clamp is lifted up by an air cylinder in the system according to an embodiment of the present invention.

FIG. 7 shows a status that a clamp 87 is lifted up by an air cylinder (status in FIGS. 5 and 9), wherein the lifted-up clamp 87 is protruded upward through a through-hole 88a of a plate 88 disposed at an upper side of the clamping device so as to fasten the bogie truck (clamping-on).

Figure 8:
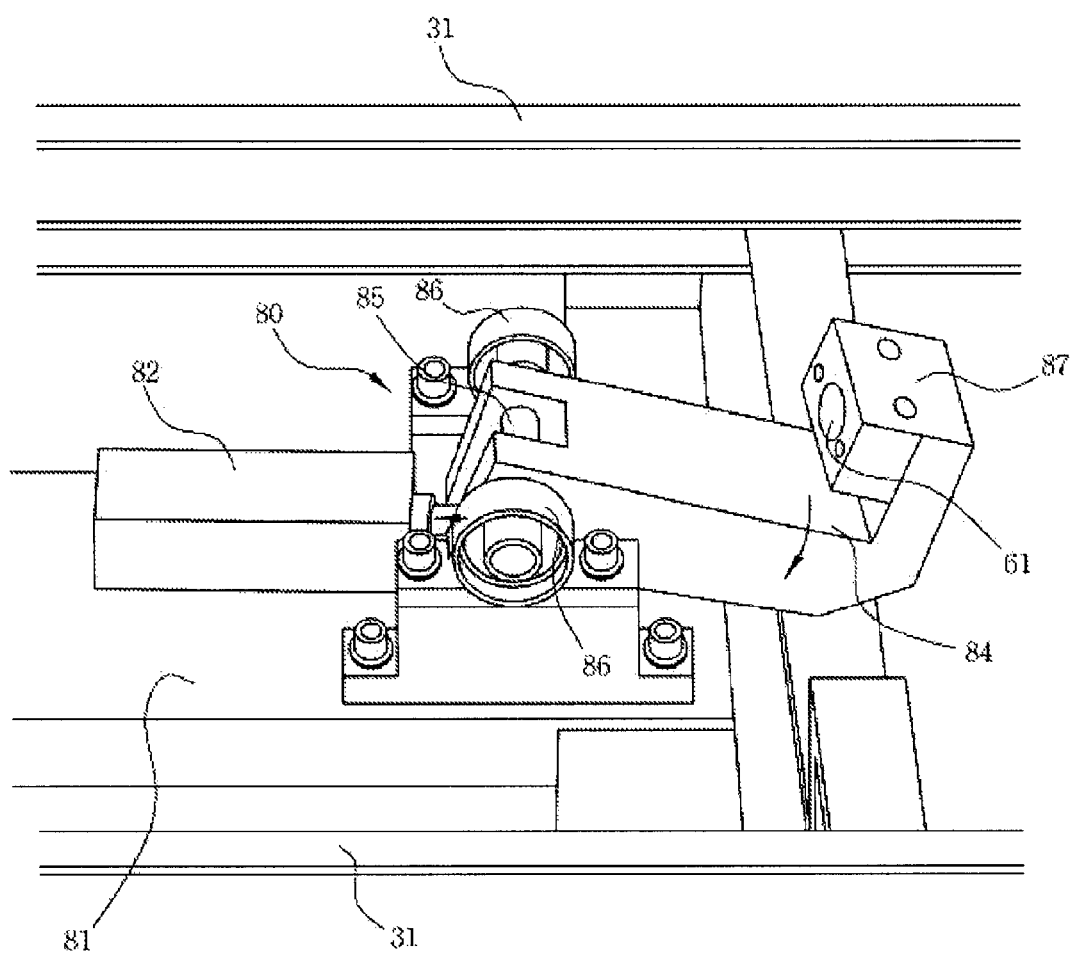
FIG. 8 is a view showing a status that the clamp is lifted down by the air cylinder in the system according to an embodiment of the present invention.

FIG. 8 shows a status that the clamp 87 is lifted down by the air cylinder (status in FIGS. 6 and 10), wherein the clamp 87 is positioned at the inside of the through-hole 88a of the plate 88, and the clamp 87 is positioned at a lower side of the plate 88 and thus separated from the bogie truck, thereby releasing the clamping status (clamping-off). FIGS. 5, 6, 7 and 8 show the clamping device 80 in which the plate 88 is removed.

Figure 9:
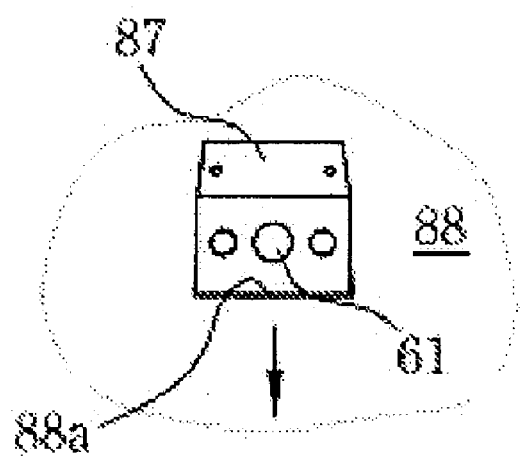
FIG. 9 is a view showing a status that a bogie truck is fastened by the clamp in the system according to an embodiment of the present invention.

FIG. 9 shows a status that the bogie truck 36 is fastened by the clamp 87, wherein the clamp 87 is protruded upward through the through-hole 88a of the plate 88 so as to be coupled to the bogie truck 36, thereby fastening the bogie truck 36 (clamping-on).

Figure 10:
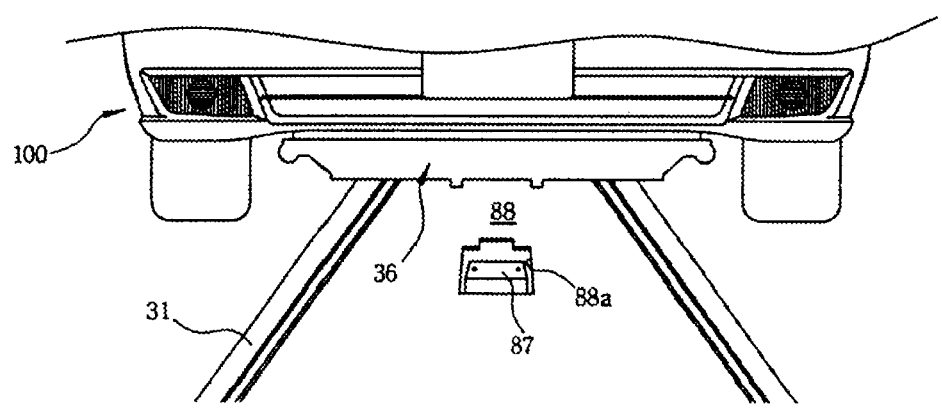
FIG. 10 is a view showing a status that the bogie truck fastened by the clamp is released in the system according to an embodiment of the present invention.

FIG. 10 shows a status that the bogie truck 36 fastened by the clamp 87 is released, wherein the clamp 87 is positioned at the inside of the through-hole 88a of the plate 88 and thus separated from the bogie truck 36, and in this status, the bogie truck 36 can be moved along the transporting rail 31. Meanwhile, in the clamping device 80, the proximity sensor 61 is disposed at the clamp 87 and the proximity sensor 61 is connected to the central computer 70 through the wire communication network 71 so as to transmit an electric signal to the central computer 70 according to the contacting and non-contacting status with the bogie truck 36 when the bogie truck 36 is fastened or released by the clamp 87. As the result, if the clamp 87 is coupled to the bogie truck 36 (clamping-on), the proximity sensor 61 disposed at the clamp 87 detects the bogie truck 36. At this time, the electric signal generated from the proximity sensor 61 is transmitted to the central computer 70 through the wire communication network 71, and if the central computer 70 receives the electric signal, the clamping-on status of the bogie truck is detected. Particularly, the central computer 70 recognizes a point of time of the clamping-on, i.e., a point of time when the clamp 87 is coupled to the bogie truck 36 (a point of time when the bogie truck is detected for the first time by the proximity sensor) as the work starting point of a corresponding process.

On the contrary, if the clamp 87 is separated from the bogie truck 36 (clamping-off), the proximity sensor 61 detects the separated status of the bogie truck 36. At this time, the electric signal generated from the proximity sensor 61 is transmitted to the central computer 70 through the wire communication network 71, and the central computer 70 detects the clamping-off status of the bogie truck 36 by receiving the electric signal.

The central computer 70 recognizes a point of time of the clamping-off, i.e., a point of time when the clamp 87 is separated from the bogie truck 36 as the work ending point of the corresponding process. Therefore, the central computer 70 can collect the work starting and ending time and working time of the corresponding process by the signal of the proximity sensor 61.

As shown in FIG. 1, the proximity sensors are disposed at all of the clamping devices provided at each process of the system of dismantling the scrapped vehicle. Each of the proximity sensors 61~67 is connected to the central computer 70 through the wire communication network 71, and the central computer 70 detects the points of time of the clamping-on/off of the bogie truck 36 by the signals generated from each of the proximity sensors 61~67 and collects the work starting and ending time and working time. Then, if the process of registering the scrapped vehicle and checking of objective parts to be dismantled (S1) is finished, the scrapped vehicle 100 is moved into an explosive part processing chamber 37 by the bogie truck 36, and then the processing of explosive parts (S2) is performed in the explosive part processing chamber 37.

Figure 4:
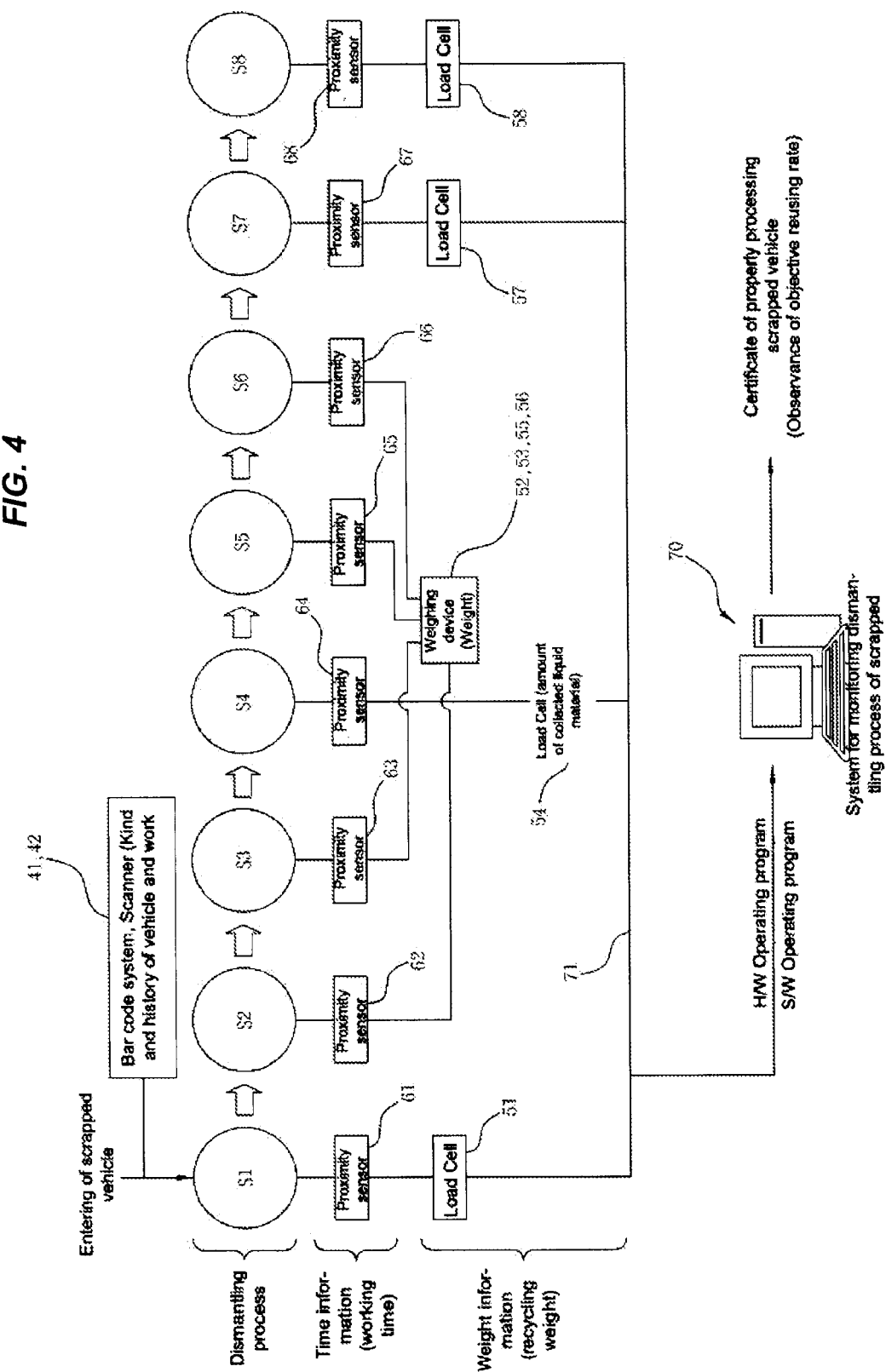
FIG. 4 is a view of an image of a program showing data collected and monitored by a central computer according to an embodiment of the present invention.

In the processing of explosive parts (S2), as shown in FIGS. 1 and 4, there is provided a weighing device 52 including scales as a weight detecting means for measuring a weight of dismantled parts. The weight of dismantled parts measured by the weight device 52 is input and collected through the wire communication network 71 on the central computer 71. At this time, the central computer 71 collects the weight information of dismantled parts, which is received by the weighing device 52, and the time information such as the work starting and ending time, the working time and the like, which is detected by the proximity sensor 62.

Meanwhile, if the processing of explosive parts (S2) is finished, the scrapped vehicle 100 is moved to the preparation process (S3), in which tires, a hood, a battery and the like are dismantled, by the bogie truck 36. Since the weighing device 53 and the proximity sensor 63 are also provided in the preparation process S3, the central computer 71 collects the weight information of dismantled parts, which is received by the weighing device 52, and the time information which is detected by the proximity sensor 62.

Next, the scrapped vehicle 100 is moved to the process of collecting liquid materials (S4) by the bogie truck 36. In the process of collecting liquid materials (S4), the liquid materials remained in the vehicle, such as coolant, fuel (gasoline, diesel, etc.), engine oil, transmission oil, oils for various mechanisms, antifreeze, brake fluid, clutch fluid, power steering fluid, washer fluid and the like, are collected.

In the process of collecting liquid materials (S4), since the collected liquid materials are separately stored in containers separated by their assortments, a detecting means for measuring an amount of each of the collected liquid materials is provided. A load cell 54 is used as the detecting means for measuring a weight of each liquid material filled in the containers. That is, the load cell 54 is disposed at each of the container to measure the weights of the collected liquid materials by their assortments. The weights of the collected liquid materials is input and collected through the wire communication network 71 on the central computer 70. The central computer 70 also collects the time information such as the work starting and ending times and the working time detected by the proximity sensor 64 together with the weight information of liquid materials.

If the process of collecting liquid materials (S4) is finished, the scrapped vehicle 100 is moved, in turn, to the processes of dismantling exterior parts (S5) and interior parts (S6). The weighing devices 55 and 56 and proximity sensors 65 and 66 are also provided at the above processes (S5 and S6) so that the weight information of dismantled parts and the time information for each operator are transmitted to the central computer 70 like in the previous processes. Thus, the detailed description thereof will be omitted. Further, the load cell 58 is also provided at the process of dismantling parts of engine/transmission (S7) so as to measure a weight of engine/transmission parts, and the weight of engine/transmission parts is input and collected through the wire communication network 71 on the central computer 70.

Like in the previous processes, the central computer 70 also collects the time information such as the work starting and ending times and the working time detected by the proximity sensor 67. And in the process of compressing a body of the scrapped vehicle (S8), the body of scrapped vehicle in which the engine/transmission is dismantled is moved to the body compressing device 38 and then compressed by the body compressing device 38. A detecting means for measuring a weight of compressed body, e.g. the load cell 58 is disposed at the body compressing device 38.

Further, the body compressing device 38 is also provided with the proximity sensor 68. The proximity sensor 68 detects the bogie truck and then outputs the electric signal like in the previous processes (S1~S7). That is, the central computer 70 recognizes a point of time when the body to be compressed is detected for the first time by the electric signal of the proximity sensor 68 as a work starting point, and also recognizes a point of time when the compressed body is moved (separated) from the proximity sensor after the compressing process is finished as a work ending point.

The weight of compressed body measured by the load cell 58 is transmitted through the wire communication network 71 to the central computer 70, and the time information such as the work starting and ending times and the working time detected by the proximity sensor 68 is also collected on the central computer 70.

FIG. 6 shows an image of a program showing data collected and monitored by the central computer according to the present invention. As shown in FIG. 6, various information for each process, such as the work starting and ending time, the working time, the weights of dismantled parts, the collected amount of liquid materials and the like, are collected and stored on the central computer 70.

According to the system for monitoring a dismantling process of scrapped vehicle of the present invention, as described above, since various information such as the work starting and ending time, the working time, the weights of dismantled parts, the collected amount of liquid materials and the like can be collected and stored by a simple operation, a working situation can be monitored in real-time, and various information for each process, and the like, can be stored in a database together with information of kind of vehicle to be dismantled.

Further, whether each process is performed properly or whether a reusing rate arrives at a desired value and the like can be monitored, and it is also possible to collect a record of working performance for each operator and evaluate facility of the dismantling processes and computerize the dismantling processes, and the collected information can be provided as useful dismantling information to car-makers.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A system for monitoring a dismantling process of scrapped vehicle, in which the scrapped vehicle is processed by a process of registering the scrapped vehicle and checking objective parts to be dismantled after entering the scrapped vehicle, a process of processing explosive parts, a preparation process, a process of collecting liquid materials, a process of dismantling exterior parts, a process of dismantling interior parts, a process of dismantling parts of engine/transmission, and a process of compressing a body of the scrapped vehicle, comprising:

an input means for inputting vehicle information and work instruction information in a process of registering the scrapped vehicle and checking objective parts to be dismantled;

a weight measuring means for measuring a weight of the entered scrapped vehicle in the process of registering the scrapped vehicle and checking objective parts to be dismantled;

a weighing means for measuring a weight of dismantled parts collected in each process and a weight of each of collected liquid materials;

a detecting means for detecting a work starting and ending point of each process;

a second weighing means for measuring a weight of compressed body in the compressing process; and a central computer in communication with the above means, for collecting, processing, storing, outputting and displaying data transmitted from the means;

wherein, in the process of registering the scrapped vehicle and checking objective parts to be dismantled, the process of processing explosive parts, preparation process, process of collecting liquid materials, process of dismantling exterior parts, process of dismantling interior parts, and process of dismantling parts of engine/transmission, the detecting means for detecting the work starting and ending point of each process is a proximity sensor disposed at a clamp of a clamping device for fastening/releasing a bogie truck at a work position, and the central computer recognizes a point of time when the clamp is coupled to the bogie truck, which is detected by the proximity sensor, as the work starting point, and also recognizes a point of time when the clamp is separated from the bogie truck as the work ending point.

2. The system according to claim 1, wherein the input means comprises a bar code system which inputs the vehicle information and the work instruction information and generates a bar code including the vehicle and work instruction information, and a scanner which reads the input information from the bar code generated by the bar code system and then transmits the information.

3. The system according to claim 1, wherein the weight measuring means for measuring the weight of the scrapped vehicle is a load cell disposed at a lifting device for transporting a bogie truck between transporting rails on a ground and in a pit at the process of registering the scrapped vehicle and checking objective parts to be dismantled.

4. The system according to claim 1, wherein the weighing means for measuring a weight of each of liquid materials collected in the process of collecting liquid materials is a load cell disposed at each container in which the liquid materials are separately collected by their assortments, so that the weight of each of the liquid materials is separately measured.

5. The system according to claim 1, wherein the input means comprises a bar code system.

6. The system according to claim 1, wherein the weight measuring means for measuring the weight of the vehicle comprises a load cell disposed at a lifting device.

7. The system according to claim 1, wherein the weighing means for measuring a weight of liquid material comprises a load cell disposed at a container in which the liquid material is collected.

8. A system for monitoring a dismantling process of scrapped vehicle, in which the scrapped vehicle is processed by a process of registering the scrapped vehicle and checking objective parts to be dismantled after entering the scrapped vehicle, a process of processing explosive parts, a preparation process, a process of collecting liquid materials, a process of dismantling exterior parts, a process of dismantling interior parts, a process of dismantling parts of engine/transmission, and a process of compressing a body of the scrapped vehicle, comprising:

an input means for inputting vehicle information and work instruction information in a process of registering the scrapped vehicle and checking objective parts to be dismantled;

a weight measuring means for measuring a weight of the entered scrapped vehicle in the process of registering the scrapped vehicle and checking objective parts to be dismantled;

a weighing means for measuring a weight of dismantled parts collected in each process and a weight of each of collected liquid materials;

a detecting means for detecting a work starting and ending point of each process;

a second weighing means for measuring a weight of compressed body in the compressing process; and a central computer in communication with the above means, for collecting, processing, storing, outputting and displaying data transmitted from the means;

wherein, in the process of compressing the body of scrapped vehicle, the detecting means for detecting the work starting and ending point is a proximity sensor disposed at a body compressing device, and the central computer recognizes a point of time when the body to be compressed is detected for the first time by the electric signal of the proximity sensor as the work starting point, and also recognizes a point of time when the compressed body is moved and separated as the work ending point.

9. The system according to claim 8, wherein the input means comprises a bar code system which inputs the vehicle information and the work instruction information and generates a bar code including the vehicle and work instruction information, and a scanner which reads the input information from the bar code generated by the bar code system and then transmits the information.

10. The system according to claim 8, wherein the weight measuring means for measuring the weight of the scrapped vehicle is a load cell disposed at a lifting device for transporting a bogie truck between transporting rails on a ground and in a pit at the process of registering the scrapped vehicle and checking objective parts to be dismantled.

11. The system according to claim 8, wherein the weighing means for measuring a weight of each of liquid materials collected in the process of collecting liquid materials is a load cell disposed at each container in which the liquid materials are separately collected by their assortments, so that the weight of each of the liquid materials is separately measured.

12. The system according to claim 8, wherein the input means comprises a bar code system.

13. The system according to claim 8, wherein the weight measuring means for measuring the weight of the vehicle comprises a load cell disposed at a lifting device.

14. The system according to claim 8, wherein the weighing means for measuring a weight of liquid material comprises a load cell disposed at a container in which the liquid material is collected.

* * * * *